(12) United States Patent
Shimizu et al.

(10) Patent No.: US 11,872,520 B2
(45) Date of Patent: Jan. 16, 2024

(54) METHOD FOR INSPECTING SEPARATION MEMBRANE MODULE AND METHOD FOR MANUFACTURING SEPARATION MEMBRANE MODULE

(71) Applicant: NGK INSULATORS, LTD., Nagoya (JP)

(72) Inventors: Katsuya Shimizu, Nagoya (JP); Makiko Ichikawa, Nagoya (JP); Kenji Yajima, Nagoya (JP); Takeshi Hagio, Inazawa (JP)

(73) Assignee: NGK INSULATORS, LTD., Nagoya (JP)

( * ) Notice: Subject to any disclaimer, the term of this patent is extended or adjusted under 35 U.S.C. 154(b) by 785 days.

(21) Appl. No.: 16/564,196

(22) Filed: Sep. 9, 2019

(65) Prior Publication Data

US 2020/0001229 A1    Jan. 2, 2020

Related U.S. Application Data

(63) Continuation of application No. PCT/JP2018/006913, filed on Feb. 26, 2018.

(30) Foreign Application Priority Data

Mar. 30, 2017    (JP) ................................. 2017-068961

(51) Int. Cl.
*B01D 53/22*    (2006.01)
*B01D 63/06*    (2006.01)
(Continued)

(52) U.S. Cl.
CPC ........... *B01D 53/228* (2013.01); *B01D 63/06* (2013.01); *B01D 65/102* (2013.01); *B01D 69/10* (2013.01)

(58) Field of Classification Search
CPC .... B01D 53/228; B01D 63/06; B01D 65/102; B01D 69/10; B01D 63/066; B01D 65/104;
(Continued)

(56) References Cited

U.S. PATENT DOCUMENTS

| 6,065,329 A | 5/2000 | Fukada et al. |
| 2012/0272826 A1 | 11/2012 | Uchikawa et al. |

(Continued)

FOREIGN PATENT DOCUMENTS

| EP | 640822 A2 * | 3/1995 | ........... B01D 65/102 |
| JP | H09-024256 A1 | 1/1997 | |

(Continued)

OTHER PUBLICATIONS

International Search Report and Written Opinion (Application No. PCT/JP2018/006913) dated May 29, 2018.

(Continued)

*Primary Examiner* — Krishnan S Menon
(74) *Attorney, Agent, or Firm* — BURR PATENT LAW, PLLC (57) ABSTRACT

A method for inspecting a separation membrane module has a sealing step for sealing a gas for inspection on a primary side of zeolite membrane. The dynamic molecular diameter for the gas for inspection is greater than 1.07 times the pore diameter in the zeolite membrane. The gas for inspection has the characteristic of having a rate of reduction for a $CO_2$ gas permeation rate in the zeolite membrane of less than 10% when a separation membrane structure is allowed to stand for 60 minutes in the gas for inspection at 25 degrees C. and 0.1 MPaG.

9 Claims, 7 Drawing Sheets

(51) Int. Cl.
  *B01D 65/10* (2006.01)
  *B01D 69/10* (2006.01)
(58) Field of Classification Search
  CPC ............ B01D 71/028; B01D 2256/245; B01D 2257/504; Y02C 20/40
  See application file for complete search history.

(56) References Cited

U.S. PATENT DOCUMENTS

| | | |
|---|---|---|
| 2016/0008771 A1 | 1/2016 | Yajima et al. |
| 2016/0016146 A1 | 1/2016 | Hagio et al. |

FOREIGN PATENT DOCUMENTS

| | | |
|---|---|---|
| JP | 2004-216284 A1 | 8/2004 |
| JP | 2007-237073 A | 9/2007 |
| JP | 2014-202237 A1 | 10/2014 |
| JP | 2015-186776 A1 | 10/2015 |
| JP | 2016-068082 A1 | 5/2016 |
| WO | 2011/105511 A1 | 9/2011 |
| WO | 2014/157324 A1 | 10/2014 |
| WO | 2014/157701 A1 | 10/2014 |

OTHER PUBLICATIONS

Chinese Office Action (Application No. 201880012739.0) dated Apr. 26, 2021.
English translation of International Preliminary Report on Patentability (Chapter I) (Application No. PCT/JP2018/006913) dated Oct. 10, 2019, 8 pages.
United Arab Emirates Office Action (Application No. P6001360) dated May 22, 2023.

\* cited by examiner

METHOD FOR INSPECTING SEPARATION MEMBRANE MODULE AND METHOD FOR MANUFACTURING SEPARATION MEMBRANE MODULE

TECHNICAL FIELD

The present invention relates to a method for inspecting a separation membrane module and to a method for manufacturing a separation membrane module.

BACKGROUND ART

Japanese Patent Application Laid-Open No. 2004-216284 discloses a method of inspecting a gas leak in a separation membrane module based on a pressure change in a gas for inspection that is sealed in a primary side of a separation membrane in a separation membrane module in which a separation membrane configured as a hollow fiber membrane is assembled into a casing.

SUMMARY

However the method disclosed in Japanese Patent Application Laid-Open No. 2004-216284 does not consider the relationship between the pore diameter of the separation membrane and the molecular diameter of the gas for inspection.

Therefore, it may be the case that the gas for inspection passes through the pores of the separation membrane and an accurate inspection of gas leak is not possible.

Furthermore, the method disclosed in Japanese Patent Application Laid-Open No. 2004-216284 does not consider the adsorption or condensation properties of the gas for inspection relative to the separation membrane. It may be the case that pores will become blocked by adsorption or condensation of the gas for inspection onto the separation membrane and therefore there will be an adverse effect on the permeation characteristics of the separation membrane after the inspection.

The present invention is proposed in light of the situation described above, and has the object of providing a method for manufacturing a separation membrane module and a method for inspecting a separation membrane module which enable an accurate inspection of gas leak while suppressing a reduction in the permeation characteristics of a separation membrane.

A method for inspecting a separation membrane module according to the present invention wherein the separation membrane module has a separation membrane structure that has a porous body and a zeolite membrane, and a casing for assembly of the separation membrane structure, and the method comprises a sealing step of sealing a gas for inspection on a primary side of the zeolite membrane. The dynamic molecular diameter of the gas for inspection is greater than 1.07 times a pore diameter in the zeolite membrane. The gas for inspection exhibits a characteristic of having a reduction rate of a $CO_2$ gas permeation rate for the zeolite membrane of less than 10% when the separation membrane structure is allowed to stand for 60 minutes in the gas for inspection at 25 degrees C. and 0.1 MPaG.

Advantageous Effects of Invention

The present invention enables provision of a method for manufacturing a separation membrane module and a method for inspecting a separation membrane module which enable an accurate inspection of gas leak while suppressing a reduction in the permeation characteristics of a separation membrane.

DESCRIPTION OF EMBODIMENTS

Separation Membrane Module 10

Figure 1:
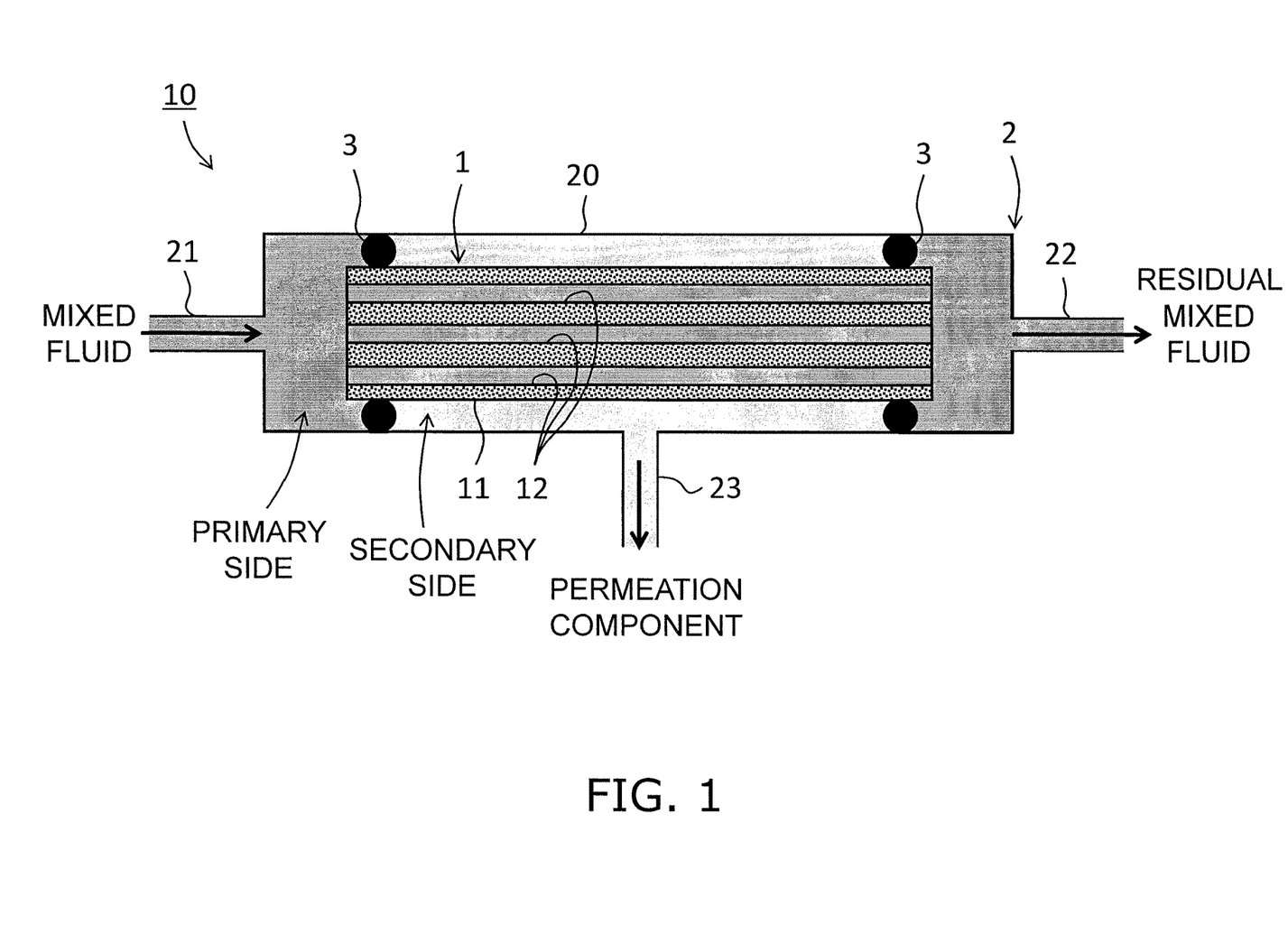
FIG. 1 is a sectional view of a separation membrane module.

FIG. 1 is a sectional view of a separation membrane module 10. The separation membrane module 10 includes a separation membrane structure 1 and a casing 2.

1. Separation Membrane Structure 1

The separation membrane structure 1 has a monolithic configuration. A monolithic configuration denotes a shape in which a plurality of cells penetrates in a longitudinal direction and includes a concept such as a honeycomb. The separation membrane structure 1 is disposed in an inner portion of the casing 2.

The separation membrane structure 1 includes a porous body 11 and a zeolite membrane 12 that configures the separation membrane.

(1) Porous Body 11

The porous body 11 is formed in a cylindrical shape that extends in a longitudinal direction. A plurality of cells CL is formed in an inner portion of the porous body 11. Each cell CL extends in a longitudinal direction. Each cell CL opens into both end faces of the porous body 11.

The porous body 11 is composed of a binder and an aggregate. The aggregate includes use of alumina, silicon carbide, titania, mullite, potsherd, and cordierite or the like. The binder includes use of at least one of an alkali metal and an alkaline earth metal, and a glass material containing aluminum (Al) and silicon (Si). The content ratio of the binder in the substrate 11 may be greater than or equal to 20 vol % and less than or equal to 40 vol %, and preferably greater than or equal to 25 vol % and less than or equal to 35 vol %.

Although there is no particular limitation in relation to the porosity of the porous body 11, for example, it may be configured as 25% to 50%. The porosity of the porous body 11 may be measured by mercury porosimetry. Although there is no particular limitation in relation to the pore diameter of the porous body 11, it can be set to 0.1 μm~50 μm. Depending on the size of the pore diameter, the pore diameter of the porous body 11 may be measured by mercury porosimetry, an air flow method described in ASTM F316, or by perm-porometry.

(2) Zeolite Membrane 12

The zeolite membrane 12 is formed on the inner surface of each cell CL. The zeolite membrane 12 is formed in a cylindrical shape. The zeolite membrane 12 enables permeation of a permeation component that is contained in a mixed fluid that is the object of a separation process. The mixed fluid is supplied to an inner surface side (referred to below as "primary side") of the zeolite membrane 12 and a permeation component flows out to an outer surface side (referred to below as "secondary side") of the zeolite membrane 12. The inner surface of the zeolite membrane 12 is also an inner surface of a cell CL. The outer surface of the zeolite membrane 12 is a contact surface with the porous body 11. In the present embodiment, the inner surface and the outer surface of the zeolite membrane 12 are respectively the principal surfaces of the zeolite membrane 12.

It is noted that the mixed fluid that is the object of a separation process may be a mixed gas or a mixed liquid. However, the present embodiment is particularly applicable to a mixed gas as the object of the separation process.

There is no particular limitation in relation to the crystalline structure of the zeolite that configures the zeolite membrane 12, and it may be for example be DDR, LTA, MFI, MOR, FER, FAU, CHA, BEA, AEI, or the like. When the zeolite membrane 12 is a DDR-type zeolite membrane, it is particularly suitable for selective separation of carbon dioxide from natural gas.

The pore diameter of the zeolite membrane 12 may be suitably determined based on the required filtration and separation performance and for example, it may be 0.2 nm to 1 nm. When the selection of a gas for inspection as described below is taken into account, the pore diameter of the zeolite membrane 12 is preferably less than or equal to 0.5 nm, and more preferably less than or equal to 0.4 nm.

The pore diameter of the zeolite membrane 12 may be uniquely determined with reference to the crystalline structure of the zeolite that configures the zeolite membrane 12. The pore diameter of the zeolite membrane 12 may be calculated with reference to the values disclosed in The International Zeolite Association (IZA) "Database of Zeolite Structures" [online], Internet <URL: http://www.iza-structure.org/databases/>.

In the present embodiment, when there is a minor diameter and major diameter in the pore diameter of the zeolite membrane 12, the "minor diameter" is used as the pore diameter of the zeolite membrane 12. The use of the "minor diameter" as the pore diameter is for the purpose of effectively suppressing permeation of the gas for inspection through the pores of the zeolite membrane 12 during gas leak inspection as described below.

2. Casing 2

The casing 2 includes a main body 20, a supply passage 21, a first recovery passage 22 and a second recovery passage 23.

The main body 20 accommodates the separation membrane structure 1. The main body 20 may be configured by a metal member (for example, stainless steel, or the like). Both end portions of the separation membrane structure 1 are assembled into an inner portion of the main body 20 by O-rings 3.

However, since there may be a leak from the periphery of the O-ring 3, that is to say, from the contact portion between the separation membrane structure 1 and the casing 2, it is necessary to perform a gas leak inspection by use of a gas for inspection. The gas leak inspection by use of a gas for inspection will be described below.

The supply passage 21 is a pipe for supplying a mixed fluid that is the object of a separation process to the main body 20. The supply passage 21 may be configured by a metal member (for example, stainless steel, or the like).

The first recovery passage 22 is a pipe for discharging a residual mixed fluid that has passed through a cell CL of the separation membrane structure 1 to an external portion. The first recovery passage 22 may be configured by a metal member (for example, stainless steel, or the like).

The second recovery passage 23 is a pipe for discharging a permeation component that has permeated the zeolite membrane 12 of the separation membrane structure 1 to an external portion. The second recovery passage 23 may be configured by a metal member (for example, stainless steel, or the like).

Method of Manufacturing Separation Membrane Module 10

An example of a method for manufacturing a separation membrane module 10 will be described.

1. Preparation of Porous Body 11

Firstly a clay is prepared by adding water, a dispersant and an organic binder such as methyl cellulose to an aggregate and a binder, and then kneading.

A monolithic green body is formed using the prepared clay in slip casting molding, press molding, or extrusion molding using a vacuum extruder.

Then, the monolithic green body is fired (for example, 500 degrees C. to 1500 degrees C., 0.5 hours to 80 hours) to thereby form a porous body 11 having a plurality of cells CL.

2. Preparation of Zeolite Membrane 12

Next, a zeolite membrane 12 is formed on an inner surface of each cell CL of the porous body 11. In this manner, the separation membrane structure 1 is completed. A method that is adapted to the crystalline structure that configures the zeolite membrane 12 may be used in the molding of the zeolite membrane 12.

3. Gas Leak Inspection of Separation Membrane Module 10

Next, a gas for inspection is used to perform a gas leak inspection of the separation membrane module 10 as described below.

(1) Selection of Gas for Inspection

Firstly a method of selecting a gas for inspection for use in the gas leak inspection will be described.

The gas for inspection for use in the gas leak inspection is preferably characterized by not exhibiting a tendency to be adsorbed by or condense onto the zeolite membrane 12, that is to say, characterized by not exhibiting a tendency to block the pores of the zeolite membrane 12. Therefore, it is necessary to use the following method to confirm in advance that the gas for inspection will not tend to be adsorbed by or condense onto the zeolite membrane 12.

Figure 2:
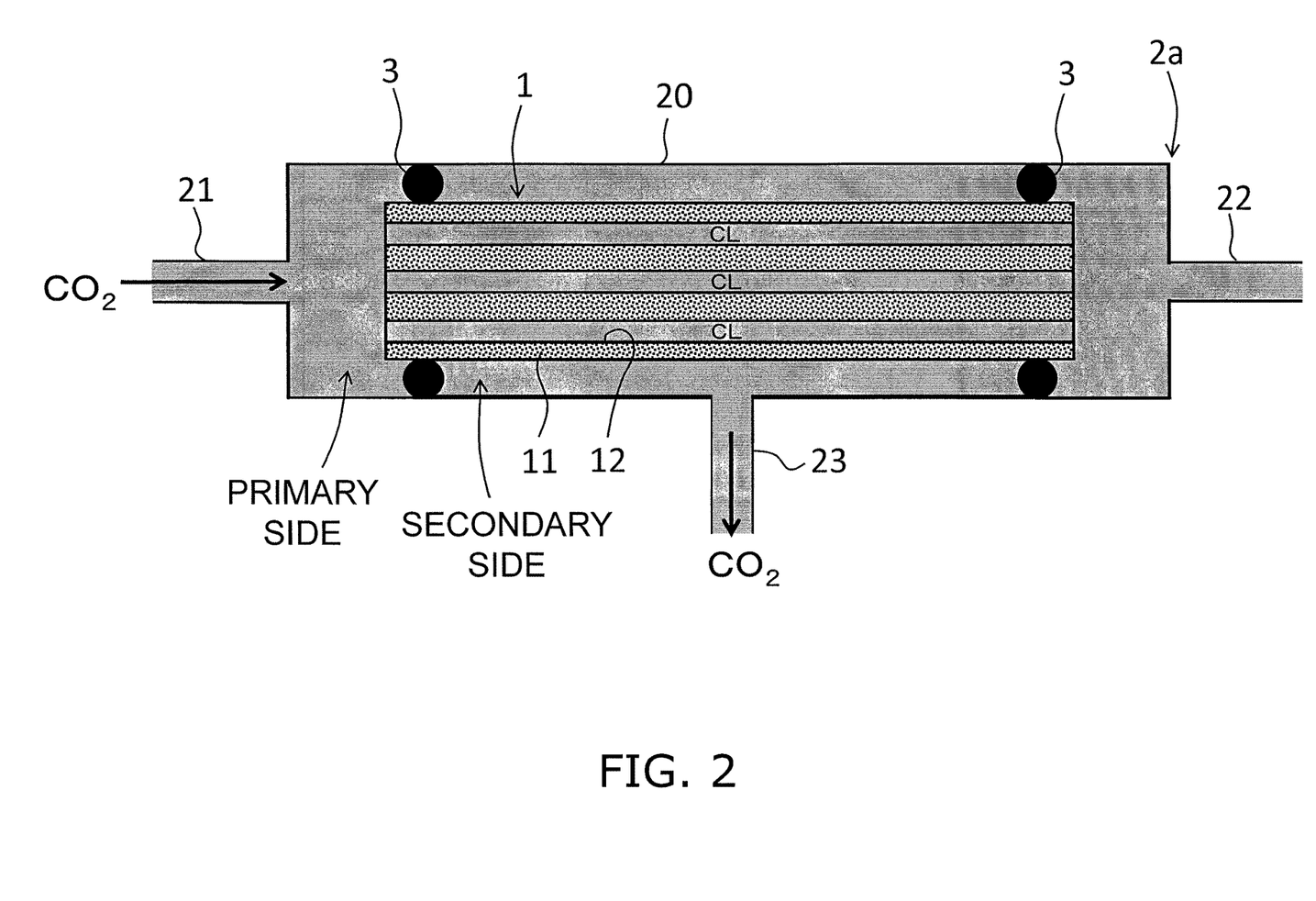
FIG. 2 is a perspective view describing a method of selecting a gas for inspection.

Firstly, as shown in FIG. 2, the separation membrane structure 1 onto which O-ring 3 is mounted is sealed into the casing 2a. The casing 2a may be the same structure as the casing 2 described above, or, in this context, may be a more simple structure than the casing 2 as long as it enables confirmation of the adsorption/condensation characteristics of the gas for inspection.

Next, carbon dioxide ($CO_2$) gas at 0.1 MPaG is supplied from the supply passage 21 to the primary side of the zeolite membrane 12. At that time, the first recovery passage 22 may be sealed by use of a seal valve.

Next, the $CO_2$ gas permeation rate [$nmol/m^2 sPa$] is measured based on the permeation flow amount of $CO_2$ gas that has permeated to the secondary side of the zeolite membrane 12.

Then, the gas for inspection is prepared. The gas for inspection is selected so that the dynamic molecular diameter is greater than 1.07 times the pore diameter of the zeolite membrane 12. In this manner, a gas leak can be accurately inspected since permeation of the gas for inspection through the pores of the zeolite membrane 12 can be suppressed during the gas leak inspection as described below.

As described above, when there is a minor diameter and a major diameter to the pore diameter of the zeolite membrane 12, the dynamic molecular diameter of the gas for inspection is 1.07 times greater than the "minor diameter" of the zeolite membrane 12. This feature is due to the fact that even when the dynamic molecular diameter of the gas for inspection is smaller than the major diameter of the zeolite membrane 12, when it is greater than 1.07 times the minor diameter, the gas for inspection is inhibited from entering the pores.

Figure 3:
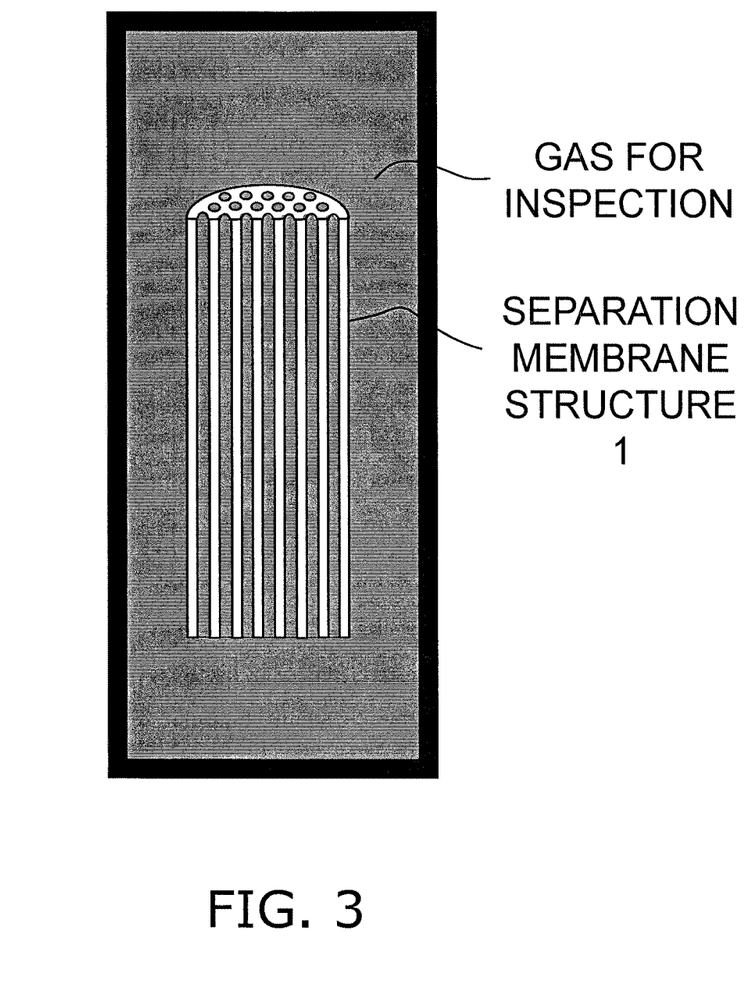
FIG. 3 is a perspective view describing a method of selecting a gas for inspection.

Then, the separation membrane structure 1 is removed from the casing 2a, and as shown in FIG. 3, the zeolite membrane 12 is exposed to the gas for inspection by allowing the separation membrane structure 1 to stand in the gas for inspection (25 degrees C., 0.1 MPaG). Exposure is enabled by allowing contact the separation membrane 12 with the gas for inspection and therefore exposure may be enabled by filling the cells with the gas for inspection.

Then, the separation membrane structure 1 is removed from the gas for inspection, and as shown in FIG. 2, it is re-assembled into the casing 2a.

Next, carbon dioxide ($CO_2$) gas at 0.1 MPaG is supplied from the supply passage 21 to the primary side of the zeolite membrane 12. At that time, the first recovery passage 22 may be sealed by use of a seal valve.

Next, the $CO_2$ gas permeation rate [$nmol/m^2sPa$] is re-measured based on the permeation flow amount of $CO_2$ gas that has permeated to the secondary side of the zeolite membrane 12.

Then, a reduction rate for the $CO_2$ gas permeation rate after exposure to the gas for inspection is calculated by subtracting the $CO_2$ gas permeation rate that was measured after exposure to the gas for inspection from the $CO_2$ gas permeation rate that was measured prior to exposure to the gas for inspection and then dividing that value by the $CO_2$ gas permeation rate prior to exposure.

When the calculated $CO_2$ gas permeation rate reduction rate is less than 10%, it is determined that the gas for inspection does not exhibit a tendency to be adsorbed by or condense onto the zeolite membrane 12 and therefore is suitable for gas leak inspection. On the other hand, when the $CO_2$ gas permeation rate reduction rate is greater than or equal to 10%, a $CO_2$ gas permeation rate reduction rate is calculated for another gas for inspection to thereby determine again whether or not a value of less than 10% is thereby obtained.

The gas for inspection that is selected in this manner will differ depending on the type or composition or the like of the zeolite membrane 12. For this reason, the gas for inspection should be selected for the zeolite membrane 12 that is actually used and there is no particular limitation in relation to the type of gas for inspection.

For example, when a DDR-type zeolite membrane is used as the zeolite membrane 12, the gas for inspection includes use of at least one type of gas selected from $CF_4$, $SF_6$ or the like.

As long as the dynamic molecular diameter of the gas for inspection is 1.07 times greater than the pore diameter of the zeolite membrane 12 and the $CO_2$ gas permeation rate reduction rate is less than 10%, a plurality of types of gas may be mixed to form a mixed gas.

Furthermore, the gas for inspection is preferably non-flammable. In this manner, the gas for inspection can be safely employed in the gas leak inspection.

The gas for inspection is preferably inert with respect to the separation membrane structure 1 and the casing 2. In this manner, the zeolite membrane 12 will not deteriorate as a result of a reaction with the gas for inspection and it is possible to suppress corrosion as a result of a reaction between the casing 2 and the gas for inspection.

(2) Gas Leak Inspection

Next, a detailed description will be given of gas leak inspection using a gas for inspection that has been selected using the method above.

Figure 4:
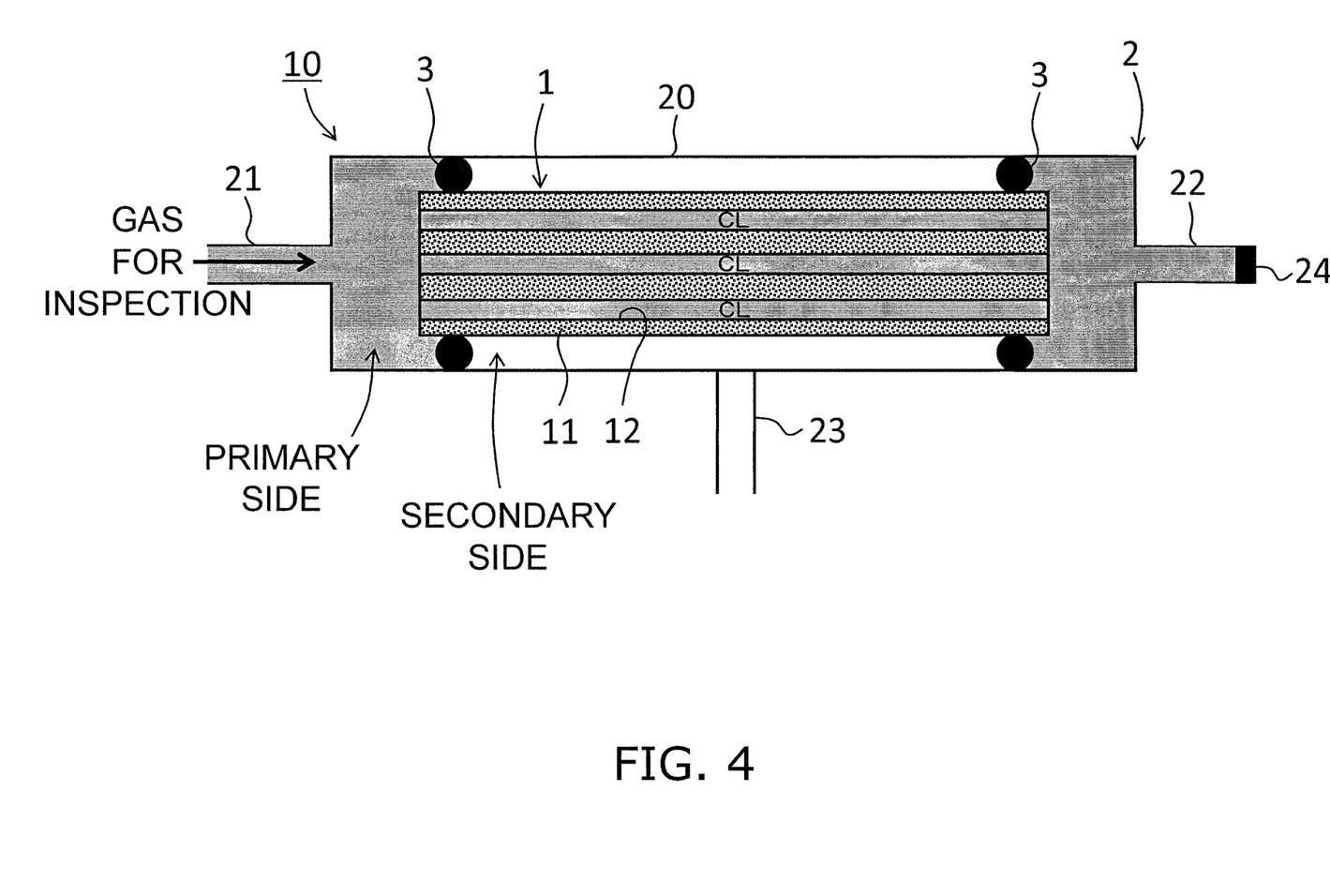
FIG. 4 is a perspective view describing a method of inspecting by use of a gas for inspection.

Firstly as shown in FIG. 4, O-rings 3 are attached to both ends of the separation membrane structure 1 and assembled into an inner portion of the casing 2 (assembly step).

Figure 5:
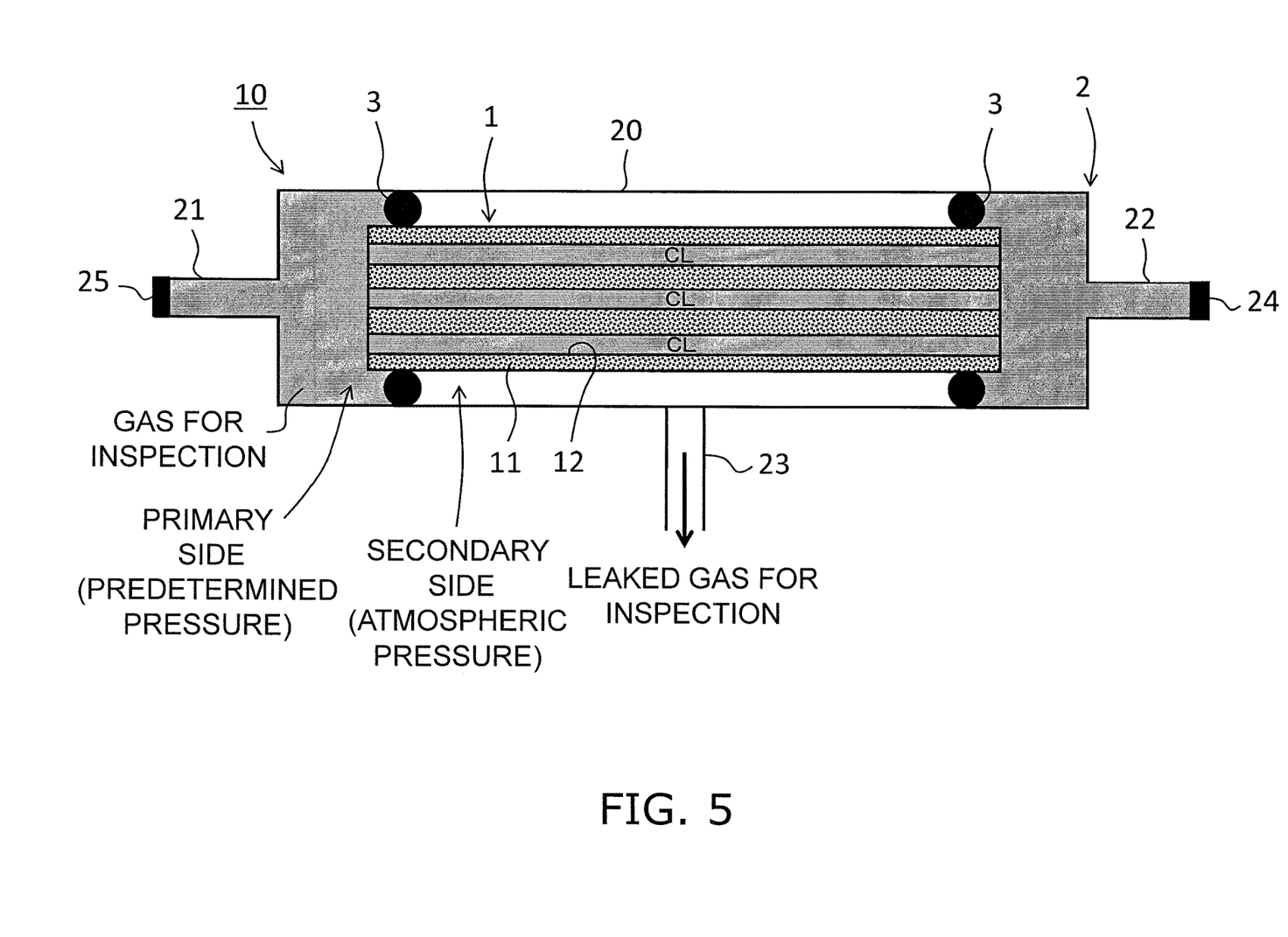
FIG. 5 is a perspective view describing a method of inspecting by use of a gas for inspection.

Then, after sealing the first recovery passage 22 with a seal valve 24, the gas for inspection that has been selected using the method above is used to fill an inner portion of the main body 20. Then as shown in FIG. 5, when the gas for inspection has reached a predetermined pressure, the supply passage 21 is sealed using a seal valve 25. In this manner, the gas for inspection is sealed on the primary side (inner surface side) of the zeolite membrane 12 (sealing step).

Although there is no particular limitation in relation to the predetermined pressure of the gas for inspection on the primary side of the zeolite membrane 12, when further increases in the accuracy of the leak inspection are taken into account under the actual use conditions for the gas separation membrane, a pressure of greater than or equal to 1 MPaG is preferred, and a pressure of greater than or equal to 3 MPaG is more preferred. Furthermore, although there is no particular limitation on the vapor pressure of the gas for inspection that is sealed, when further inhibition of the adsorption/condensation characteristics of the gas for inspection in relation to the zeolite membrane 12 is taken into account, it is preferred that a component having a vapor pressure of less than or equal to 100 kPa is not included in the gas for inspection, and more preferred that a component having a vapor pressure of less than or equal to 60 kPa is not included in the gas for inspection. The vapor pressure of the gas for inspection can be controlled by adjusting the temperature of the gas for inspection. It is noted that as shown in FIG. 5, the second recovery passage 23 is not blocked and the secondary side (outer surface side) of the zeolite membrane 12 is exposed to atmospheric pressure.

Then, a total leak amount Ta for the gas for inspection to the secondary side of the zeolite membrane 12 is obtained. The total leak amount Ta is a total of a membrane defect leak amount Tb that is caused by membrane defects in the zeolite membrane 12 and a seal leak amount Tc that is caused by seal failure in the separation membrane structure 1. The total leak amount Ta is preferably calculated based on the pressure change (pressure reduction range) of the gas for inspection on the primary side of the zeolite membrane 12. In this manner, the total leak amount Ta can be accurately acquired in comparison for example to a method that uses an airflow meter.

Next, a gas leak in the separation membrane module 10 is evaluated with reference to the total leak amount Ta of the gas for inspection (evaluation step). In the present embodiment, the gas leak in the separation membrane module 10 is evaluated by confirming whether or not the seal leak amount Tc that is obtained by subtracting the membrane defect leak amount Tb from the total leak amount Ta is less than or equal to a predetermined threshold. When the seal leak amount Tc is less than or equal to a predetermined threshold, it is determined that the seal characteristics of the contact portion between the separation membrane structure 1 and the casing 2 are acceptable, and when the seal leak amount Tc is greater than a predetermined threshold, it is determined that the seal characteristics of the contact portion between the separation membrane structure 1 and the casing 2 are unacceptable.

In this manner, a membrane defect leak amount Tb that is included in the total leak amount Ta must be calculated in order to evaluate a gas leak in the separation membrane module 10 based on the seal leak amount Tc. A membrane defect leak amount equation that is unique to the zeolite membrane 12 must be acquired in advance in order to accurately calculate the membrane defect leak amount Tb. A method of acquiring the membrane defect leak amount equation will be described below.

Figure 6:
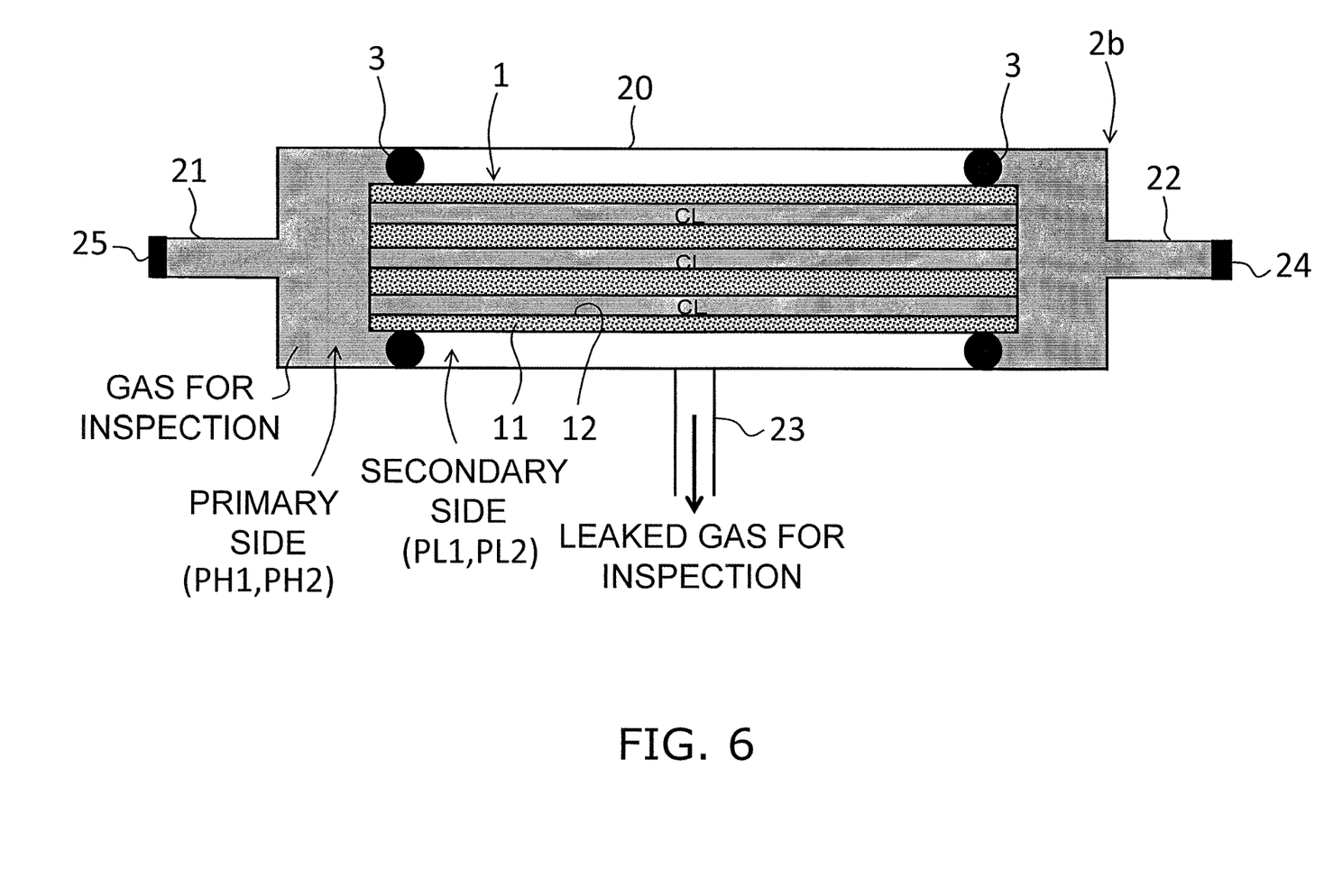
FIG. 6 is a perspective view describing a method of deriving a membrane defect leak amount equation.

Firstly, as shown in FIG. 6, an O-ring 3 is mounted on the separation membrane structure 1 and sealed in the casing 2b. The casing 2b a may be the same structure as the casing 2 described above, or, in this context, may be a more simple structure that the casing 2 as long as it enables confirmation of the extent of membrane defects in the zeolite membrane 12.

Next, a gas for inspection is sealed onto the primary side of the zeolite membrane 12. At that time, the pressure on the primary side is denoted as PH1 and the pressure on the secondary side is denoted by PL1. A membrane defect leak rate Q1 [$nmol/m^2sPa$] is calculated based on the membrane defect leak flow amount of the gas for inspection that leaks through the membrane defects in the zeolite membrane 12 to the secondary side. It is noted that the pressure PH1 is preferably less than the predetermined pressure that is applied to the gas for inspection during gas leak inspection. This feature is due to the fact that seal leaks are caused when the pressure PH1 is excessively large in which case it is no longer possible to inspect only leaks resulting from membrane defects.

Next, the gas for inspection is resealed on the primary side of the zeolite membrane 12. At that time, the pressure on the primary side is denoted as PH2 and the pressure on the secondary side is denoted by PL2. Although the pressure PH2 must take a different value from the pressure PH1, the pressure PL2 may be the same as the pressure PL1. In addition, a membrane defect leak rate Q2 [$nmol/m^2sPa$] is calculated based on the membrane defect leak flow amount of the gas for inspection that passes through any membrane defects in the zeolite membrane 12 to the secondary side.

Figure 7:
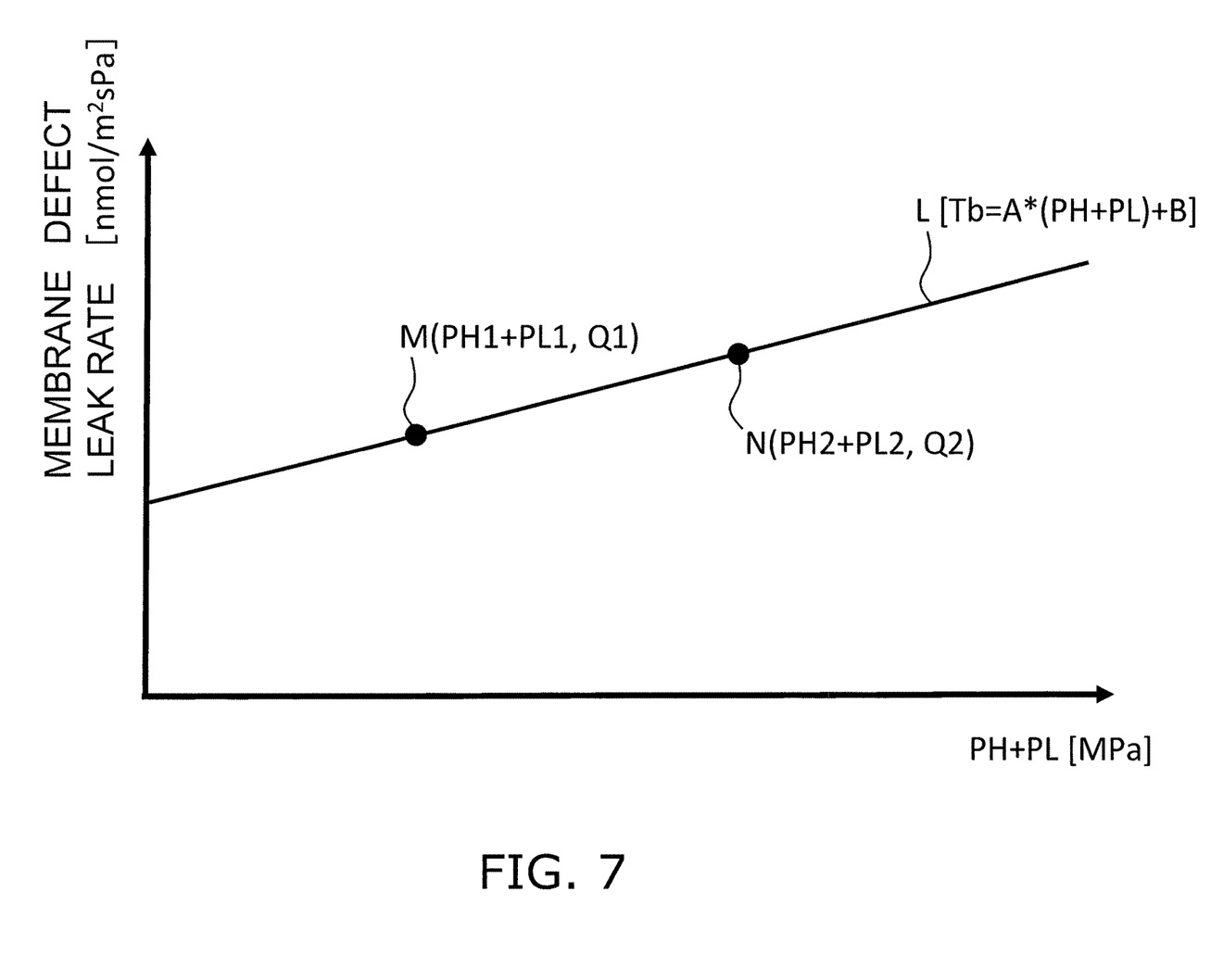
FIG. 7 is a perspective view describing a method of deriving a membrane defect leak amount equation.

Next as shown in FIG. 7, the sum of the pressure PH on the primary side and the pressure PL on the secondary side (PH+PL) is taken to be the X axis and the membrane defect leak rate Q for the gas for inspection is taken to be the Y axis on a two dimensional coordinate system and thereby a point M (PH1+PL1, Q1) and a point N (PH2+PL2, Q2) can be plotted. The equation of a straight line L that connects these two points is taken to be the membrane defect leak amount equation.

More specifically, the membrane defect leak amount equation is expressed as shown in Equation 1 below.

$$Tb = A \times (PH+PL) + B \quad \text{Equation 1}$$

In Equation 1, Tb is the leak amount caused by membrane defects in the zeolite membrane 12, A is the slope of the straight line L and B is the y intercept of the straight line L.

It is noted that in FIG. 7, although a membrane defect leak amount equation is obtained with reference to two points being the point M and the point N, the accuracy of the membrane defect leak amount equation may be enhanced by increasing the plot number. When the plot number is greater than or equal to 3, a straight line L may be obtained by linear approximation using a least squares method.

A membrane defect leak amount Tb during the gas leak inspection can be calculated by substituting the pressure PH on the primary side and the pressure PL on the secondary side during the gas leak inspection into Equation 1. As described above, a seal leak amount Tc can be calculated by subtracting the membrane defect leak amount Tb from the total leak amount Ta.

(3) Recovery of Gas for Inspection

After completion of gas seal inspection, the gas for inspection is recovered from the first recovery passage 22 (recovery step). In this recovery step, a recovery tank enclosing the same type of gas as the gas for inspection is preferably used to recover the gas for inspection. In this manner, reuse of the recovered gas for inspection is facilitated.

The separation membrane module 10 is completed after passing through the assembly step, sealing step, evaluation step and recovery step as described above.

EXAMPLES

Sample No. 1

1. Preparation of Separation Membrane Structure

Firstly, 30 vol % of an inorganic binding material was added to 70 vol % of alumina particles (aggregate) having an average particle diameter of 12 μm. Then, a molding auxiliary agent such as an organic binder or the like and a pore forming agent were added and dry mixed. Water and a surface active agent were added, and the mixture was mixed and kneaded to prepare a clay. The inorganic binding material includes use of talc, kaolin, feldspar, clay or the like having an average particle diameter of 1 to 5 μm to form a mixture of $SiO_2$ (70 mass %), $Al_2O_3$ (16 mass %), alkali earth metals and alkali metals (11 mass %).

Next, the clay was extrusion molded to thereby prepare a green body for a monolithic porous body. Then, the green body for the porous body was fired (1250 degrees C., one hour) to thereby obtain an alumina substrate having a large number of cells.

Next, PVA (organic binder) was added to the alumina powder to prepare a slurry and thereby form a green body for the intermediate layer on an inner surface of the cells of the alumina substrate by a filtration method using the slurry. Then, the green body for the intermediate layer was fired (1250 degrees C., 1 hour) to form the intermediate layer.

Next, both end surfaces of the alumina substrate were sealed with glass. In this manner, a monolithic porous body was completed.

Next, a separation membrane was formed with reference to the method disclosed in International Publication WO2011105511 in which a DDR-type zeolite membrane (average pore diameter: 0.40 nm) was formed on an intermediate layer of an inner surface of each cell of a porous body. In this manner, the separation membrane structure according to Sample No. 1 was completed in a configuration of a DDR-type zeolite membrane and a porous body that forms the DDR-type zeolite membrane.

2. Evaluation of $CF_4$ as Gas for Inspection

Firstly, the separation membrane structure with O-rings mounted thereon was assembled into the casing (reference is made to FIG. 2).

Then carbon dioxide ($CO_2$) gas at 0.1 MPaG is supplied to the primary side of the DDR-type zeolite membrane and the $CO_2$ gas permeation rate is measured based on the permeation flow amount of $CO_2$ gas that has permeated to the secondary side of the zeolite membrane. The $CO_2$ gas permeation rate was found to be 760 [$nmol/m^2sPa$].

Then, $CF_4$ was prepared as the gas for inspection. The $CF_4$ dynamic molecular diameter is 0.47 nm and the pore diameter (minor diameter) of the DDR-type zeolite membrane is 0.36 nm. Therefore, the dynamic molecular diameter of $CF_4$ gas is 1.31 times the pore diameter of the DDR-type zeolite membrane and it can be determined that $CF_4$ gas is a gas that does not exhibit a tendency to permeate the pores of the DDR-type zeolite membrane.

Then, the separation membrane structure was removed from the casing and allowed to stand for 60 minutes in the $CF_4$ gas (25 degrees C. and 0.1 MPaG) (reference is made to FIG. 3). Since the critical pressure of $CF_4$ gas is 3.7 MPa, the vapor pressure of $CF_4$ gas at 25 degrees C. is not less than or equal to 100 kPa.

Next, the separation membrane structure was removed from the $CF_4$ gas and re-assembled into the casing (reference is made to FIG. 2).

Then $CO_2$ gas at 0.1 MPaG was supplied to the DDR-type zeolite membrane and the $CO_2$ gas permeation rate was measured based on the permeation flow amount of $CO_2$ gas that has permeated to the secondary side of the DDR-type zeolite membrane. The $CO_2$ gas permeation rate was found to be 760 [$nmol/m^2sPa$].

In this manner, since there was no change in the $CO_2$ gas permeation rate before and after exposure to $CF_4$ gas, the $CO_2$ gas permeation rate reduction rate after exposure was 0%. On the basis of these observations, $CF_4$ gas was determined to be a gas that does not exhibit a tendency to be adsorbed by or condense onto a DDR-type zeolite membrane.

In this manner, $CF_4$ gas was evaluated as being suitable for use in gas leak inspection of a DDR-type zeolite membrane.

3. Derivation of Membrane Defect Leak Amount Equation

A membrane defect leak amount equation is derived to calculate a seal leak amount by subtracting a membrane defect leak amount from the total leak amount in a gas leak inspection as described below.

Firstly, the separation membrane structure with O-rings mounted thereon was assembled into the casing (reference is made to FIG. 6).

Then, $CF_4$ gas was sealed on the primary side of the DDR-type zeolite membrane and the membrane defect leak rate [$nmol/m^2sPa$] was calculated based on the membrane defect leak flow amount of $CF_4$ gas that leaks to the secondary side of the DDR-type zeolite membrane. At that time, the membrane defect leak rate was acquired with reference to four pressure levels obtained by varying the primary side pressure to 0.1 MPaG, 0.2 MPaG, 0.3 MPaG and 0.35 MPaG while maintaining the secondary side pressure at 0.0 MPaG.

Next, the sum of the pressure on the primary side and the pressure on the secondary side is taken to be the X axis and the $CF_4$ gas membrane defect leak rate is taken to be the Y axis in a two dimensional coordinate system and the measurement results for the four pressure levels are thereby plotted to obtain a membrane defect leak amount equation by linear approximation using a least squares method.

The membrane defect leak amount equation for the DDR-type zeolite membrane used in Sample No. 1 is expressed by Equation 2 below.

Membrane defect leak amount=0.207×(sum of primary pressure and secondary pressure)+0.163   Equation 2

4. Gas Leak Inspection

Next, a gas leak inspection using $CF_4$ gas as the gas for inspection was performed.

Firstly, the separation membrane structure with O-rings mounted thereon was assembled into the casing (reference is made to FIG. 2).

Next, $CF_4$ gas was used to fill the primary side of the DDR-type zeolite membrane at 3 MPaG while the secondary side of the DDR-type zeolite membrane was exposed to atmospheric pressure.

Then, the total leak amount of $CF_4$ gas to the secondary side was obtained based on the pressure reduction range for $CF_4$ gas on the primary side.

Next, a membrane defect leak amount for $CF_4$ gas during the gas leak inspection was calculated by substituting a primary side pressure of 3 MPaG and a secondary side pressure of 0 MPaG into Equation 2.

Then, the seal leak amount for $CF_4$ gas was calculated by subtracting the membrane defect leak amount for $CF_4$ gas from the total leak amount for $CF_4$ gas. On that basis, it was evaluated whether or not the seal leak amount for $CF_4$ gas was less than or equal to a predetermined threshold.

Thereafter, the primary side $CF_4$ gas was recovered into a stainless steel tank to thereby complete the gas leak inspection.

Sample No. 2

In Sample No. 2, a separation membrane module that is the same as Sample No. 1 was prepared and a gas leak inspection was performed on the separation membrane module by use of $SF_6$ as a gas for inspection.

The $SF_6$ dynamic molecular diameter is 0.55nm which is 1.53 times the pore diameter of the DDR-type zeolite membrane. Therefore, it was determined that $SF_6$ gas is a gas that does not exhibit a tendency to permeate the pores in the DDR-type zeolite membrane.

In this manner, as shown in Table 1, since there was no change in the $CO_2$ gas permeation rate before and after exposure to $SF_6$ gas, the $CO_2$ gas permeation rate reduction rate after exposure was 0%. On the basis of these observations, $SF_6$ gas was determined to be a gas that does not exhibit a tendency to absorb or condense onto a DDR-type zeolite membrane.

In this manner, $SF_6$ gas was evaluated as being suitable for use in gas leak inspection of a DDR-type zeolite membrane.

Sample No. 3

In Sample No. 3, a separation membrane module was prepared to include an AEI-type zeolite membrane that was prepared with reference to the method disclosed in International Publication WO2014/157324, and in the same manner as Sample No. 1, $CF_4$ gas was used in the gas leak inspection.

The $CF_4$ dynamic molecular diameter is 0.47 nm and the pore diameter of an AEI-type zeolite membrane is 0.38. Therefore, since the dynamic molecular diameter for $CF_4$ gas is 1.23 times a pore diameter in the AEI-type zeolite membrane, $CF_4$ gas was determined to be a gas that does not exhibit a tendency to permeate the pores in the AEI-type zeolite membrane.

Furthermore, as shown in Table 1, since the $CO_2$ gas permeation rate before exposure to $CF_4$ gas was 369 [$nmol/m^2sPa$] and the $CO_2$ gas permeation rate after exposure to $CF_4$ gas was 368 [$nmol/m^2sPa$], the $CO_2$ gas permeation rate reduction rate after exposure was 0.3%. On the basis of these observations, $CF_4$ gas was determined to be a gas that does not exhibit a tendency to absorb or condense onto an AEI-type zeolite membrane.

In this manner, $CF_4$ gas was evaluated as being suitable for use in gas leak inspection of an AEI-type zeolite membrane.

TABLE 1

| Sample No. | Membrane Type | | Gas for Inspection | | Dynamic Molecule Size of Gas for Inspection/ Pore Diameter of Zeolite (Times) | $CO_2$ Permeation Rate prior to Exposure to Gas for Inspection [nmol/m²sPa] | $CO_2$ Permeation Rate after Exposure to Gas for Inspection [nmol/m²sPa] | $CO_2$ Gas Permeation Rate Reduction Rate after Exposure to Gas for Inspection [%] |
|---|---|---|---|---|---|---|---|---|
| | Zeolite Type | Pore Diameter [nm] | Chemical Formula | Dynamic Molecule Size [nm] | | | | |
| No. 1 | DDR | 0.36 | $CF_4$ | 0.47 | 1.31 | 760 | 760 | 0 |
| No. 2 | DDR | 0.36 | $SF_6$ | 0.55 | 1.53 | 760 | 760 | 0 |
| No. 3 | AEI | 0.38 | $CF_4$ | 0.47 | 1.23 | 369 | 368 | −0.3 |

The invention claimed is:

1. A method for inspecting a separation membrane module, the separation module comprising a separation membrane structure that has a porous body and a zeolite membrane assembled and sealed in a casing to form a primary side of the zeolite membrane and a secondary side of the zeolite membrane, and the method comprising:
    sealing a gas for inspection on the primary side of the zeolite membrane;
    evaluating a total leak amount for the gas for inspection to the secondary side of the zeolite membrane, after the sealing step;
    calculating a membrane defect leak amount caused by a membrane defect in the zeolite membrane based on a membrane defect leak amount equation below;
    calculating a seal leak amount caused by seal failure in the separation membrane structure by subtracting the membrane defect leak amount from the total leak amount; and
    evaluating whether a gas leak in the separation membrane module due to a seal leak is acceptable based on a predetermined threshold of the seal leak amount;
    wherein a dynamic molecular diameter of the gas for inspection is greater than 1.07 times a pore diameter of the zeolite membrane;
    the gas for inspection exhibits a characteristic of having a reduction rate of a $CO_2$ gas permeation rate for the zeolite membrane of less than 10%; the reduction rate of the $CO_2$ gas permeation rate is determined by
    supplying $CO_2$ gas at 0.1 MPaG to the primary side of the zeolite membrane,
    measuring a $CO_2$ gas permeation rate based on a permeation flow amount of $CO_2$ gas that has permeated to the secondary side of the zeolite membrane,
    exposing the zeolite membrane to the gas for inspection at 25 degrees C. and 0.1 MPaG for 60 minutes,
    resupplying $CO_2$ gas at 0.1 MPaG to the primary side of the zeolite membrane again,
    remeasuring a $CO_2$ gas permeation rate based on a permeation flow amount of $CO_2$ gas that has permeated to the secondary side of the zeolite membrane, and
    calculating the reduction rate for the $CO_2$ gas permeation rate by subtracting the $CO_2$ gas permeation rate that was measured after exposure to the gas for inspection from the $CO_2$ gas permeation rate that was measured prior to exposure to the gas for inspection and then dividing the value by the $CO_2$ gas permeation rate prior to exposure;
    membrane defect leak amount equation: $Tb=A \times (PH+PL)+B$, where Tb denotes the membrane defect leak amount caused by the membrane defect in the zeolite membrane, PH denotes a pressure on the primary side, PL denotes a pressure on the secondary side, A denotes a slope of the line of a straight line resulting from the membrane defect leak amount equation, and B denotes a y-intercept resulting from the membrane defect leak amount equation; and
    a pressure of the gas for inspection on the primary side when acquiring the membrane defect leak amount equation is less than a pressure of the gas for inspection when evaluating the total leak amount.

2. The method for inspecting a separation membrane module according to claim 1, wherein
    the gas for inspection in the sealing step does not contain a component that has a vapor pressure of less than or equal to 100 kPa.

3. The method for inspecting a separation membrane module according to claim 1, wherein
    in the evaluation step, the total leak amount is acquired based on a pressure change in the gas for inspection on the primary side.

4. The method for inspecting a separation membrane module according to claim 1, further comprising:
    a recovery step of recovering the gas for inspection, after the sealing step.

5. The method for inspecting a separation membrane module according to claim 4, wherein
    in the recovery step, the gas for inspection is recovered in a recovery tank that encloses a gas of the same type as the gas for inspection.

6. The method for inspecting a separation membrane module according to claim 1, wherein
    in the sealing step, the pressure of the gas for inspection on the primary side is greater than or equal to 1 MPaG.

7. The method for inspecting a separation membrane module according to claim 1, wherein
    the porous body has a monolithic configuration with a plurality of cells, and
    the zeolite membrane is formed on an inner surface of the respective plurality of cells.

8. The method for inspecting a separation membrane module according to claim 1, wherein
    the pore diameter of the zeolite membrane is less than or equal to 0.5 nm.

9. A method for manufacturing a separation membrane module comprising:
    assembling and sealing a separation membrane structure that has a porous body and a zeolite membrane into a casing to form a primary side of the zeolite membrane and a secondary side of the zeolite membrane; and sealing a gas for inspection on the primary side of the zeolite membrane;

evaluating a total leak amount for the gas for inspection to the secondary side of the zeolite membrane, after the sealing step;

calculating a membrane defect leak amount caused by a membrane defect in the zeolite membrane based on a membrane defect leak amount equation below;

calculating a seal leak amount caused by seal failure in the separation membrane structure by subtracting the membrane defect leak amount from the total leak amount; and evaluating whether a gas leak in the separation membrane module due to a seal leak is acceptable based on a predetermined threshold of the seal leak amount;

wherein a dynamic molecular diameter for the gas for inspection is greater than 1.07 times a pore diameter in the zeolite membrane;

the gas for inspection exhibits a characteristic of having a reduction rate of a $CO_2$ gas permeation rate for the zeolite membrane of less than 10%; the reduction rate of the $CO_2$ gas permeation rate is determined by supplying $CO_2$ gas at 0.1 MPaG to the primary side of the zeolite membrane, measuring a $CO_2$ gas permeation rate based on a permeation flow amount of $CO_2$ gas that has permeated to the secondary side of the zeolite membrane, exposing the zeolite membrane to the gas for inspection at 25 degrees C. and 0.1 MPaG for 60 minutes, resupplying $CO_2$ gas at 0.1 MPaG to the primary side of the zeolite membrane again, remeasuring a $CO_2$ gas permeation rate based on a permeation flow amount of $CO_2$ gas that has permeated to the secondary side of the zeolite membrane, and calculating the reduction rate for the $CO_2$ gas permeation rate by subtracting the $CO_2$ gas permeation rate that was measured after exposure to the gas for inspection from the $CO_2$ gas permeation rate that was measured prior to exposure to the gas for inspection and then dividing the value by the $CO_2$ gas permeation rate prior to exposure;

membrane defect leak amount equation: $Tb = A \times (PH + PL) + B$, where Tb denotes the membrane defect leak amount caused by the membrane defect in the zeolite membrane, PH denotes a pressure on the primary side, PL denotes a pressure on the secondary side, A denotes a slope of the line of straight line resulting from the membrane defect leak amount equation, and B denotes a y-intercept resulting from the membrane defect leak amount equation; and a pressure of the gas for inspection on the primary side when acquiring the membrane defect leak amount equation is less than a pressure of the gas for inspection when evaluating the total leak amount.

* * * * *